Feb. 4, 1964   J. F. PAULSEN   3,120,382
DEVICES FOR FORMING A RESILIENT CONNECTION
BETWEEN TWO PARTS OF STRUCTURES
Filed May 1, 1961   3 Sheets-Sheet 1
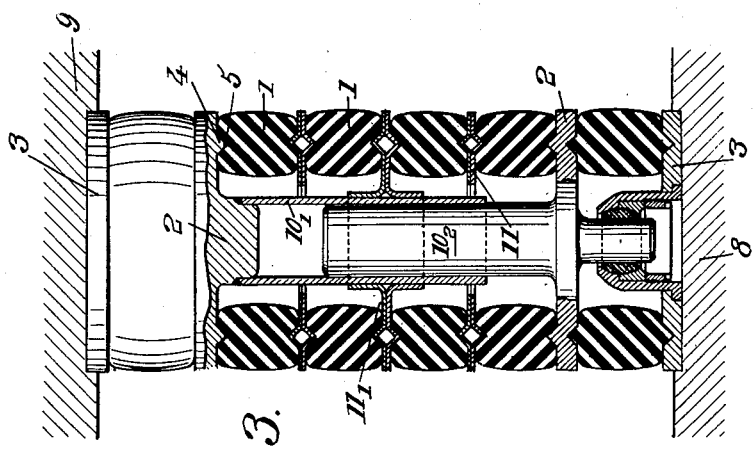
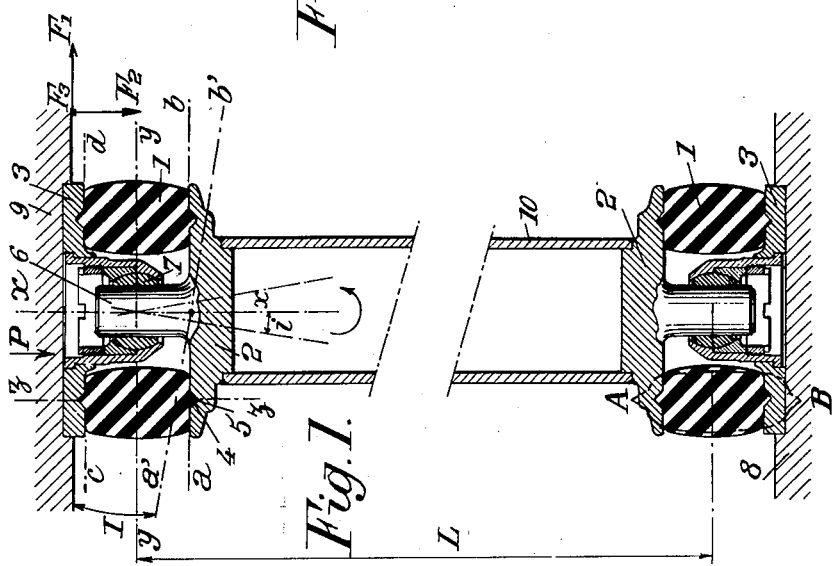
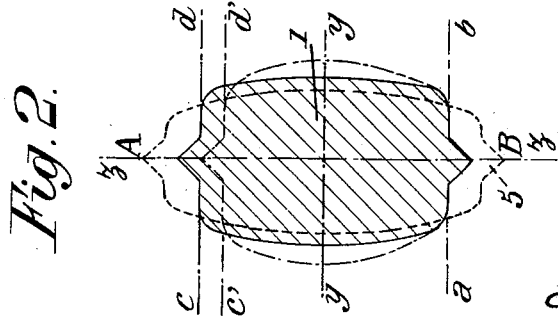
INVENTOR
JEAN FELIX PAULSEN
BY
ATTORNEY

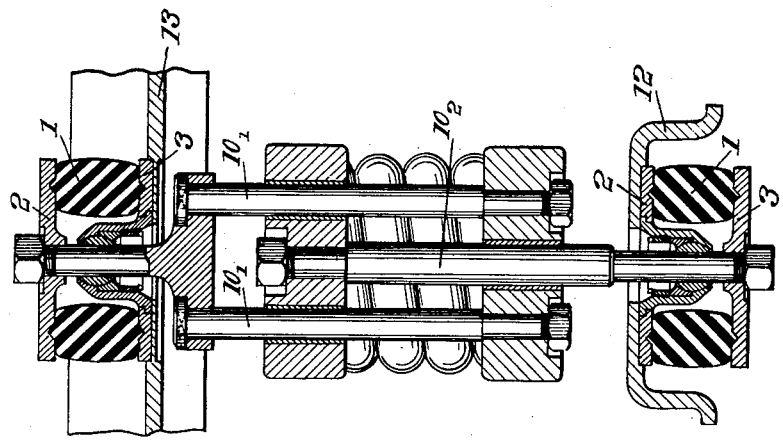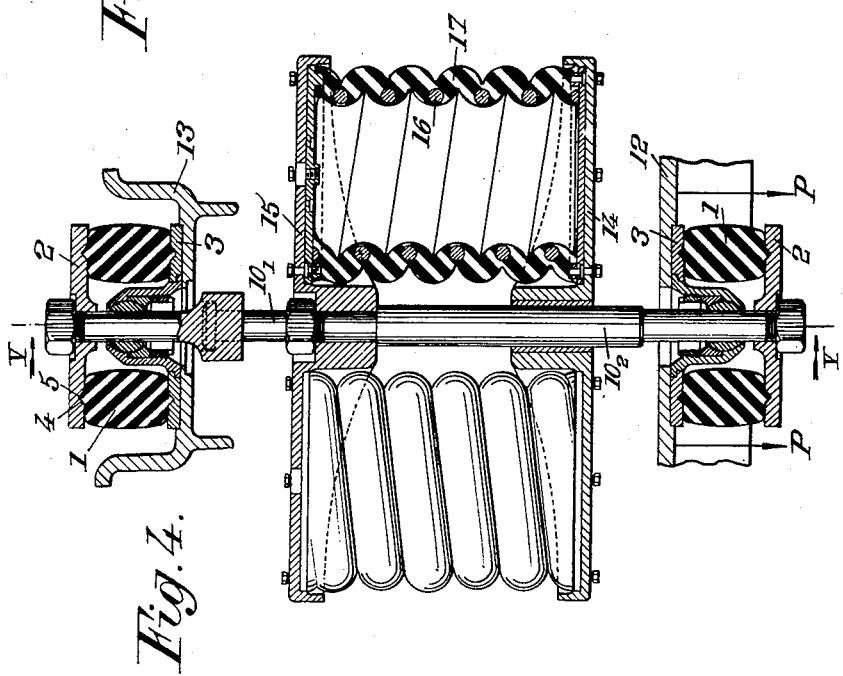

Feb. 4, 1964　　J. F. PAULSEN　　3,120,382
DEVICES FOR FORMING A RESILIENT CONNECTION
BETWEEN TWO PARTS OF STRUCTURES
Filed May 1, 1961　　3 Sheets-Sheet 3
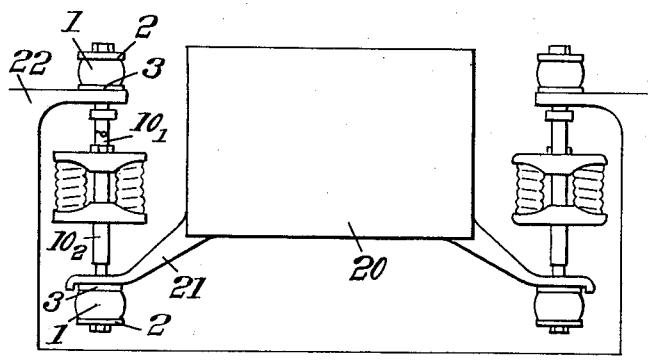
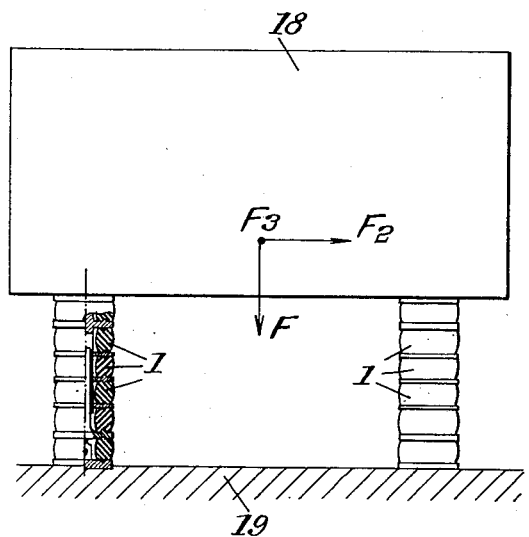
INVENTOR
JEAN FELIX PAULSEN
BY
ATTORNEY United States Patent Office 3,120,382
Patented Feb. 4, 1964

3,120,382
DEVICES FOR FORMING A RESILIENT CONNECTION BETWEEN TWO PARTS OF STRUCTURES
Jean Félix Paulsen, Paris, France, assignor to Ste Luxembourgeoise de Brevets et de Participations, a society of France
Filed May 1, 1961, Ser. No. 106,899
Claims priority, application France May 2, 1960
5 Claims. (Cl. 267—63)

The present invention relates to devices forming a resilient connection between two parts or structures.

The chief object of this invention is to provide a device of this kind which is simpler and more efficient than those used for the same purpose up to the present time.

According to the present invention this device comprises annular members of a resilient material the transverse section of which is of general elliptic shape with the major axis disposed transversely to the plane of their middle line, these annular members being subjected to a compression between two plates which tend to move toward each other under the effect of the forces acting upon the system including said device, said members being guided in such manner as to be able to have limited relative movements in translation and in rotation.

Preferred embodiments of the present invention will be hereinafter described with reference to the accompanying drawings, given merely by way of example and in which:

FIG. 1 is a sectional view of a connecting device to be interposed between two parts or structure, made according to the present invention.

FIG. 2 separately shows, in section, on an enlarged scale, one of the resilient members of the connecting device according to the invention.

FIG. 3 shows a connection of the same kind, but comprising a link which is resiliently extensible and retractable, the whole according to the present invention.

FIGS. 4 and 5 are an elevational view and a side view, respectively, of a device of the same kind, where the connecting links are subjected to tensile stresses.

FIG. 6 is a diagrammatic elevational view of a suspension device made according to this invention.

FIG. 7 is a diagrammatic elevational view of a device for suspension of a machine with respect to a support, this device being made according to the invention.

The device essentially comprises at least one resilient annular member 1 and two plates 2, 3 (FIGS. 1 and 2) acting to compress said annular member between them under the effect of the external forces applied to the system. The annular member 1 has an ovoidal section, with its major axis $z$—$z$ transverse to the plane of its middle line $y$—$y$ or to the plane of the above mentioned plates.

FIG. 2 shows the section of member 1, before it has been crushed between points A and B, and after crushing between lines $ab$ and $cd$, these lines corresponding to the contact planes of said plates (FIG. 1).

This oval shape is particularly advantageous for mounting purposes. In particular, it will be seen that if it is supposed that the ends of the major axis of the oval-shaped section are provided with projections (or grooves) 4, the latter may cooperate with corresponding grooves (or projections) 5 of the plates. After crushing of said ends between the surfaces $ab$ and $cd$ of said plates, this will ensure a fixation without danger, while permitting free deformations of the external surface of the annular members.

Such a device permits of making a resilient coupling if care has been taken to provide, between plates 2 and 3, guiding means permitting limited relative displacements, both in rotation, and in translation. Such means consist for instance of a pin 6 carried by one of the plates and engaging with a free sliding fit in a swivel 7 interposed between the two plates.

FIG. 1 supposes that use is made, between a supporting plate 8 and a structure 9 subjected to the action of a static load P, of a hinged system comprising at least one link 10, with at both ends thereof, resilient couplings such as above described. It will be seen that such a device is particularly well adapted to withstand in an elastic manner all the translation or rotation movements resulting from all forces such as F1, F2, F3 in the three directions of space.

As a matter of fact, the above mentioned connecting device permits the following displacements:

(a) First any variation of the compression forces such as F2 has for its effect to modify the distance between the two plates 2, 3 with a deformation of the rubber member, $c$—$d$ coming for instance into the position $c'd'$ (FIG. 2).

(b) On the other hand, owing to the presence of the swivel joint, plates 2, 3 may take, still with corresponding deformation of annular member 1, relative inclinations I, line $ab$ coming for instance into $a'b'$ (FIG. 1). It follows that under the effect of transverse forces such as F1, F3, link 10 may take inclinations I corresponding to important relative displacements ($L \sin I$) between elements 8, 9, according to the direction of these transverse forces.

(c) Finally, annular member 1 may accessorily deform by twisting about an axis such as $x$—$x$ (FIG. 1), which permits some relative rotation of structure 9 about a vertical axis.

Such devices are therefore suitable for a great number of applications.

In FIG. 3 it has been supposed that the link 10 of FIG. 1 is replaced by two telescopic elements $10_1$, $10_2$ passing through a pile of annular members 1 separated from each other by small plate elements, some of which $11_1$ may be used for an accessory guiding on the outside of the tube $10_1$.

FIGS. 4 and 5 illustrate another embodiment of the invention wherein there is interposed, between two structures 12, 13, one of which 12 is suspended to the other one 13, a system of links subjected to tensile stress. The resilient couplings are mounted in a reverse manner with respect to the arrangement of FIG. 1.

This link system, in the case of FIGS. 4 and 5, is supposed to consist of two kind of link elements $10_1$ and $10_2$ acting upon plates 14, 15 between which is mounted a combined resilient and pneumatic device, for instance comprising springs 16 cooperating with rubber cushions 17 compressed air at variable pressure being possibly introduced through suitable regulating means into the chamber thus formed.

There is a great number of applications of such devices. For instance, they may be used in a general manner for suspension purposes of two parts such as 18 and 19 with respect to each other, as shown by FIG. 6, these two parts being connected through various resilient means or links of the kind of those of FIGS. 1 and 3, or FIGS. 4, 5 (vehicle suspensions, suspensions for trucks and railway vehicles, or the like).

They may also be used for suspension of machine or machine elements to protect them against vibrations.

FIG. 7 shows, by way of example, the suspensions of a machine 20 by means of arms 21 connected to the bottom part of a device of the kind for instance of FIGS. 4, 5, these devices bearing at their top ends on a fixed frame 22.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In combination, two structures to be connected together, and subjected to the action of forces urging them toward each other in a given direction, a connecting link extending between said structures, substantially in said direction, and two devices for resiliently connecting each of the ends of said link with one of said structures, respectively, each of said devices comprising two plates respectively carried by one of said link ends and the corresponding structure, respectively, said plates facing each other, at least one annular member of resilient material interposed edgewise between said plates so as to be compressed by them, the sections of this annular member by an axial plane parallel to said direction being of general elliptical shape, with the major axes of the ellipses parallel to said direction, and means distinct from said annular member for operatively connecting said two plates with each other to permit limited relative displacements thereof both with translatory movements in said direction and with angular displacements about a pivot point.

2. A combination according to claim 1 in which said link is deformable in the direction of its length.

3. A combination according to claim 1 in which said link comprises a plurality of annular members of a resilient material juxtaposed to one another, the transverse section of each of said last mentioned annular members being of general elliptical shape, with the major axes of the ellipses parallel to the longitudinal direction of said link.

4. A device for resiliently connecting together two parts subjected to the action of forces urging them toward each other in a given direction, this device comprising, in combination, two plates transverse to this direction carried by said parts respectively and facing each other, at least one annular member of resilient material interposed edgewise between said plates so as to be compressed between them, the sections of this annular member by an axial plane parallel to said direction being of general elliptical shape, with the major axes of the ellipses parallel to said direction, and a swivelling and sliding joint for operatively connecting said two plates with each other to permit limited relative displacements thereof both with translatory movements in said direction toward and away from each other and with angular displacements about a pivot point.

5. A device according to claim 4 in which the edges of said annular member are provided with projections, said plates being provided with recesses to accommodate said projections.

References Cited in the file of this patent

UNITED STATES PATENTS

| 1,657,291 | Weiland | Jan. 24, 1928 |
| 1,936,389 | Hallquist | Nov. 21, 1933 |

FOREIGN PATENTS

| 398,697 | France | Mar. 30, 1909 |
| 692,762 | Germany | June 26, 1940 |